United States Patent
Choi et al.

(10) Patent No.: US 10,862,710 B2
(45) Date of Patent: Dec. 8, 2020

(54) NODE MANAGEMENT GATEWAY DEVICE IN DISTRIBUTION NETWORK AND GRID NETWORK AND METHOD THEREOF

(71) Applicant: DOOSAN HEAVY INDUSTRIES & CONSTRUCTION CO., LTD., Changwon-si (KR)

(72) Inventors: Jong Min Choi, Yongin-si (KR); Young Hoon Seo, Suwon-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 134 days.

(21) Appl. No.: 16/178,536

(22) Filed: Nov. 1, 2018

(65) Prior Publication Data

US 2019/0158314 A1 May 23, 2019

(30) Foreign Application Priority Data

Nov. 21, 2017 (KR) .......................... 10-2017-0155531

(51) Int. Cl.
*H04L 12/66* (2006.01)
*H04L 29/12* (2006.01)
(Continued)

(52) U.S. Cl.
CPC .......... *H04L 12/66* (2013.01); *H04L 61/2007* (2013.01); *H04L 67/12* (2013.01);
(Continued)

(58) Field of Classification Search
CPC ..... H04L 12/66; H04L 61/2007; H04L 67/12; H04L 67/2804; H04L 69/169;
(Continued)

(56) References Cited

U.S. PATENT DOCUMENTS

2012/0266209 A1 10/2012 Gooding et al.
2015/0304429 A1* 10/2015 Martens ................ H04L 67/141
　　　　　　　　　　　　　　　　　　　　　　　　　709/202
(Continued)

FOREIGN PATENT DOCUMENTS

JP　　　　2002-077242 A　　3/2002
KR　　10-2006-0003608 A　　1/2006
(Continued)

OTHER PUBLICATIONS

An European Search Report dated Mar. 29, 2019 in connection with European Patent Application No. 18207142.3 which corresponds to the above-referenced U.S. application.
(Continued)

*Primary Examiner* — Melvin C Marcelo
(74) *Attorney, Agent, or Firm* — INVENSTONE Patent, LLC (57) ABSTRACT

A distribution network system having a plurality of nodes using a scheme for data-centric object-oriented communication (DDS) effectively manages the frequently occurring connections for each node and the real-time addition or deletion of a node. Each node includes a gateway connected to a Wide Area Network (WAN) and configured to transmit and receive a message using a Real-Time Publish-Subscribe (RTPS) protocol that applies simple tunneling to communicate as if all nodes communicate in a Local Area Network (LAN), and to insert magic information into a header of the message, the inserted magic information including source IP information of the message, destination IP information of the message, and destination User Datagram Protocol (UDP) information of the message.

16 Claims, 7 Drawing Sheets

(51) Int. Cl.
*H04L 29/06* (2006.01)
*H04L 29/08* (2006.01)

(52) U.S. Cl.
CPC ........ *H04L 67/2804* (2013.01); *H04L 69/169* (2013.01); *H04L 69/22* (2013.01); *H04L 69/26* (2013.01); *H04L 61/103* (2013.01); *H04L 61/2514* (2013.01); *H04L 61/6022* (2013.01); *H04L 61/6063* (2013.01)

(58) Field of Classification Search
CPC ....... H04L 29/22; H04L 69/26; H04L 61/103; H04L 61/2514; H04L 61/6022; H04L 61/6063
See application file for complete search history.

(56) References Cited

U.S. PATENT DOCUMENTS

| | | | |
|---|---|---|---|
| 2017/0280381 A1* | 9/2017 | Hoffmann | H04W 48/18 |
| 2018/0151875 A1 | 5/2018 | Jung et al. | |
| 2019/0044818 A1* | 2/2019 | Nolan | H04W 8/005 |

FOREIGN PATENT DOCUMENTS

| | | |
|---|---|---|
| KR | 10-2008-0021192 A | 3/2008 |
| KR | 101157039 B1 | 6/2012 |
| KR | 10-2013-0118593 A | 10/2013 |
| KR | 10-1575862 B1 | 12/2015 |
| KR | 10-1602100 B1 | 3/2016 |
| KR | 10-1716582 B1 | 3/2017 |
| WO | 2015059128 A1 | 4/2015 |

OTHER PUBLICATIONS

An European Search Report dated Jul. 26, 2019 in connection with European Patent Application No. 18207142.3 which corresponds to the above-referenced U.S. application.
A Japanese Office Action dated Sep. 17, 2019 in connection with Japanese Patent Application No. 2018-160524 which corresponds to the above-referenced U.S. application.
XP015006811.
A Korean Office Action dated Dec. 12, 2018 in connection with Korean Patent Application No. 10-2017-0155531 which corresponds to the above-referenced U.S. application.

* cited by examiner

[FIG. 1]

RELATED ART

NODE MANAGEMENT GATEWAY DEVICE IN DISTRIBUTION NETWORK AND GRID NETWORK AND METHOD THEREOF

CROSS-REFERENCE TO RELATED APPLICATIONS

This application claims priority to Korean Patent Application No. 10-2017-0155531, filed on Nov. 21, 2017, the disclosure of which is incorporated herein by reference in its entirety.

BACKGROUND OF THE DISCLOSURE

Field of the Disclosure

The present disclosure relates to a node management gateway device and a method thereof, and more particularly, to a node management gateway device and a method thereof, which transmit and receive messages using a Real-Time Publish-Subscribe (RTPS) protocol of a data-centric object-oriented communication (Data Distribution Service (DDS)) between system connected switches of a Distributed Energy Resource Management System (DERMS) connected to an energy storage system, a solar power generation system, a wind power generation system, or an electric vehicle system and a Feeder Remote Terminal Unit (FRTU) of a Data Management System (DMS) connected to a distribution system or a transmission system, thus managing the connection frequently occurred between the nodes and the addition and deletion of the node in real time.

Description of the Related Art

Figure 1:
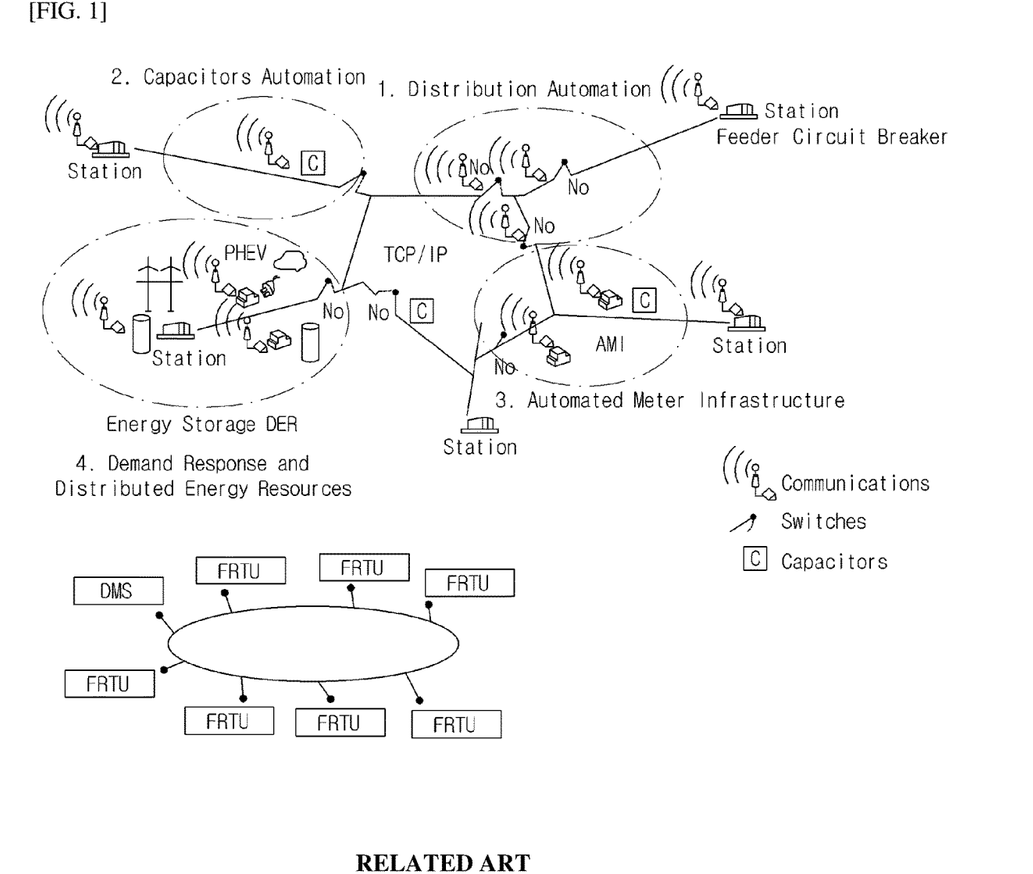
FIG. 1 is a diagram illustrating a network configuration of a DERMS and a DMS in a general distribution network and grid network.

Renewable energy source systems may include, for example, an Energy Storage System (ESS), a wind power generation system, a solar power generation system, and an electric vehicle, which can be connected to each other through system-connected switches of a Distributed Energy Resource Management System (DERMS). FIG. 1 illustrates a network configuration of a DERMS and a DMS in general distribution network and grid network.

As illustrated in FIG. 1, the electric power generated from the renewable energy source system is supplied to a transmission system or a distribution system through a Feeder Remote Terminal Unit (FRTU) of a Data Management System (DMS).

The Distributed Energy Resource Management System (DERMS) or the Data Management System (DMS), etc. performs the real-time access and control with various renewable control facilities and system switches through the distribution network and the grid network.

Unlike the widely used World Wide Web, the grid network is an internet network that can concentrate computer processing capacity in one place, and was named 'grid' having the meaning of 'grid line' because it is similar to a power grid that supplies power to homes and industrial facilities. That is, a geographically dispersed high-performance computer, large database (DB), various information and communication advanced equipment, etc. can be interlocked and mutually shared over a network. When this technology called 'distributed computing' or 'parallel computing' is used, it can connect a supercomputer and a general computer to each difficult region to make the high speed computation and mass data processing that was difficult with the conventional computer technology.

The distribution network as a distribution line network extending from a distribution substation to the reception end can be composed of a feed line that is not connected to the load from the distribution substation to a trunk, the trunk that branches the branch line by connecting to the feed line, and a branch line that is branched from the trunk at a suitable location to be extended to the reception end.

However, there is a problem in that the Distributed Energy Resource Management System (DERMS) or the Data Management System (DMS), etc. currently uses mainly a Transmission Control Protocol (TCP) socket-based communication and is this ineffective in managing the frequently occurring connections for each node and the real-time addition or deletion of a node.

In addition, there is a problem in that the TCP/IP based communication network is used, such that a complicated system is required for the management efficiency of the renewable based distribution network. The implementation of communication between different types of systems is also complicated.

SUMMARY OF THE DISCLOSURE

An object of the present disclosure for solving the above-mentioned problems is to provide a node management gateway device and a method thereof, which transmit and receive messages using an RTPS protocol of a data-centric object-oriented communication (DDS) between system connected switches of a Distributed Energy Resource Management System (DERMS) connected to an energy storage system, a solar power generation system, a wind power generation system, or an electric vehicle system and a Feeder Remote Terminal Unit (FRTU) of a Data Management System (DMS) connected to a distribution system or a transmission system, thus effectively managing the frequently occurring connections for each node and the real-time addition or deletion of a node.

A distribution network system in accordance with an embodiment of the present disclosure for achieving the above-described object, in the distribution network system having a plurality of nodes using a data-centric object-oriented communication (Data Distribution Service (DDS)) scheme, is characterized that each of the plurality of nodes can include a gateway connected to a Wide Area Network (WAN), the gateway can transmit or receive a message using a Real-Time Publish-Subscribe (RTPS) protocol by applying simple tunneling to communicate as if all nodes communicate in a Local Area Network (LAN) and can add magic information to a header of the message, and the magic information can include source IP information, destination IP information, and destination UDP information of the message.

Meanwhile, a node management gateway device in accordance with an embodiment of the present disclosure for achieving the above-described object, as the node management gateway device that is included in a node using a data-centric object-oriented communication (Data Distribution Service (DDS)) scheme, and communicates with other gateway devices connected to a Wide Area Network (WAN), can include a Real-Time Publish-Subscribe (RTPS) processing unit for transmitting or receiving a message with the other gateway devices using the RTPS protocol of the data-centric object-oriented communication (DDS), and adding magic information to a header of the message to transmit it to the WAN, and a network connection unit for executing the network connection with the other gateway devices for executing an operation of the RTPS processing unit.

Here, the magic information can include source IP information, destination IP information, and destination UDP information of the message.

Meanwhile, a method of managing a node of a gateway device in accordance with an embodiment of the present disclosure for achieving the above-described object, as the method of managing the node of the gateway device connected to a destination device, and for communicating with a source gateway device connected to a source device through a Wide Area Network (WAN), can include the gateway device receiving the message having IP information from the destination device P1; the gateway device converting the IP information in the received message into actual network IP information to store it in a virtual subnet mapping table; the gateway device transmitting the message having the actual network IP information to the WAN; the gateway device receiving a reply message from the WAN; the gateway device converting the actual network IP information into the IP information originally based on the virtual subnet mapping table in the received reply message; and the gateway device delivering the reply message that the actual network IP information has been converted into the IP information originally to the destination device.

Other aspects, advantages, and features of the present disclosure will become more apparent on the basis of the following description in the entire specification including the following sections: Brief Description of the Drawings, Description of Specific Embodiments, and Claims.

According to the present disclosure, it is possible to manage the frequently occurring connections between respective nodes such as the Distributed Energy Resource Management System (DERMS) or the Data Management System (DMS), and to manage the real-time addition and deletion of a node through the DDS communication middleware based gateway.

In addition, it is possible to transmit and receive the RTPS message based on the DDS communication middleware, thus executing the connection between the respective nodes in real time even if connection information of the other party cannot be known.

In addition, it is possible to use the same API for all hardware (HW), an Operating System (OS), and a programming language depending upon the DDS basis, thus being interlocked with any system and further minimizing additional engineering.

In addition, it is possible to manage a real-time event when adding and deleting the node because of its excellent scalability due to the data-centric communication.

In addition, it is possible to maintain the reliability by ensuring communication quality with the QoS policy.

In addition, by using the DDS based communication, it is possible to efficiently perform renewable based distribution network management without a complicated system, and to easily perform the communication between different types of systems.

Then, it is possible to shorten the power failure time through the direct communication between the FRTUs because the communication scheme for operating the FRTU of the Data Management System (DMS) can also perform the real-time communication between the large scale devices.

DESCRIPTION OF SPECIFIC EMBODIMENTS

Hereinafter, exemplary embodiments of the present disclosure will be described in detail with reference to the accompanying drawings so that those skilled in the art can easily practice the present disclosure. The present disclosure can be implemented in various different forms, and is not limited to the exemplary embodiments described herein.

In order to clearly illustrate the present disclosure, parts not related to the description are omitted, and like parts are denoted by similar reference numerals throughout the specification.

Throughout this specification, it will be understood that when an element is referred to as being "connected" to another element, it can be "directly connected" to the other element or "electrically connected" to the other element with other elements interposed therebetween. It will be further understood that when an element is referred to as "comprises" another element, the element is intended not to exclude other elements, but to further include other elements, unless the context clearly indicates otherwise.

When it is described that any one part is "on" the other part, it can mean that the part is directly on the other part or any other part is interposed therebetween. On the contrary, when it is described that any one part is "directly on" the other part, there is no other part interposed therebetween.

The terms "first," "second," "third" and the like are used to illustrate different parts, components, areas, layers and/or sections, but are not limited thereto. The terms are only used to differentiate a certain part, component, area, layer or section from other part, component, area, layer or section. Accordingly, a first part, component, area, layer or section, which will be mentioned hereinafter, can be referred to as a second part, component, area, layer or section without departing from the scope of the present disclosure.

The terminology used herein is for the purpose of describing particular embodiments only and is not intended to limit the present disclosure. As used herein, the singular forms are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, and/or components.

Terms "below", "above", and the like indicating a relative space can be used to more easily describe a relationship between one part illustrated in the drawings with another part. These terms are intended to include other meanings or operations of a device that is being used, in addition to meanings intended in the drawings. For example, when the device in the drawing is inverted, any parts described as being "below" other parts can be described as being "above" the other parts. Therefore, the exemplary term "below" includes both of an upper direction and a lower direction. The device can rotate by 90° or other angles, and the terms indicating a relative space are also interpreted according thereto.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be additionally interpreted as having a meaning that is consistent with their meaning in the context of the relevant art and/or the present disclosure, and will not be interpreted in an idealized or overly formal sense unless expressly so defined herein.

Hereinafter, exemplary embodiments of the present disclosure will be described in detail with reference to the accompanying drawings so that those skilled in the art can easily practice the present disclosure. However, the present disclosure can be implemented in various different forms, and is not limited to the exemplary embodiments described herein.

Figure 2:
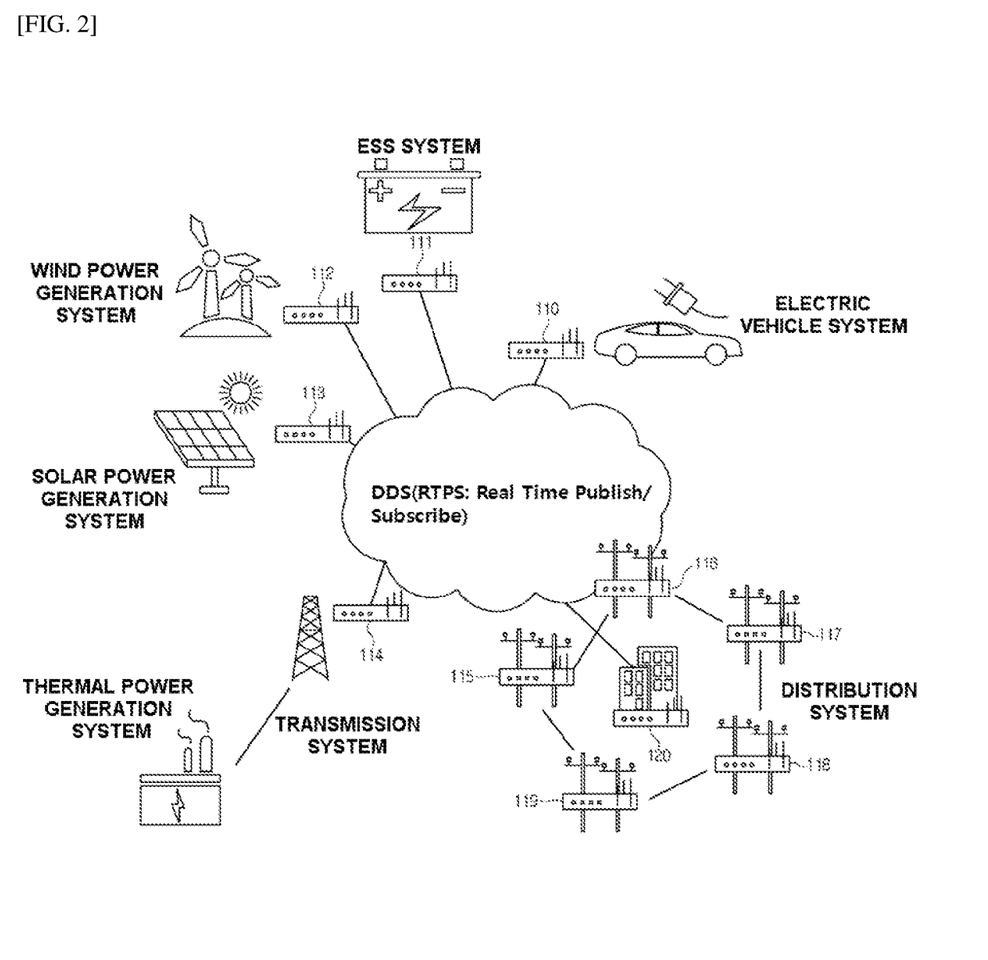
FIG. 2 is a diagram schematically illustrating a configuration of a distribution network system to which a node management gateway device in accordance with an embodiment of the present disclosure is applied.

FIG. 2 schematically illustrates a configuration of a distribution network system to which a node management gateway device in accordance with an embodiment of the present disclosure is applied.

Referring to FIG. 2, a distribution network system in accordance with an embodiment of the present disclosure includes the node management gateway devices 110 to 113 at each node of a Distributed Energy Resource Management System (DERMS) that manages the connection of an Energy Storage System (ESS) system, a solar power generation system, a wind power generation system, or an electric vehicle system, and includes the node management gateway devices 114 to 120 even at each node of a Data Management System (DMS) that manages the connection of a transmission system and a distribution system.

The plurality of nodes communicate using the data-centric object-oriented communication (Data Distribution Service) scheme, and each node can include the node management gateway device 110 to 120 connected to a Wide Area Network (WAN).

Here, each node can be configured to include each device (P1, P2, . . . , Pn) of a production device P1 for producing energy in an energy storage system, a solar power generation system, a wind power generation system, an electric vehicle system, etc., a demand device P2 for consuming energy, a storage device P4 for storing energy, a server device P3 for managing each device, etc., and the node management gateway devices (GW1, GW2, . . . , GWn) 110 to 120 connected to the respective devices (P1, P2, . . . , Pn).

Each of the node management gateway devices 110 to 120 is all connected to the WAN but transmits or receives messages using a Real-Time Publish-Subscribe (RTPS) protocol by applying Simple Tunneling to communicate as if all nodes communicate in a Local Area Network (LAN).

Figure 3:
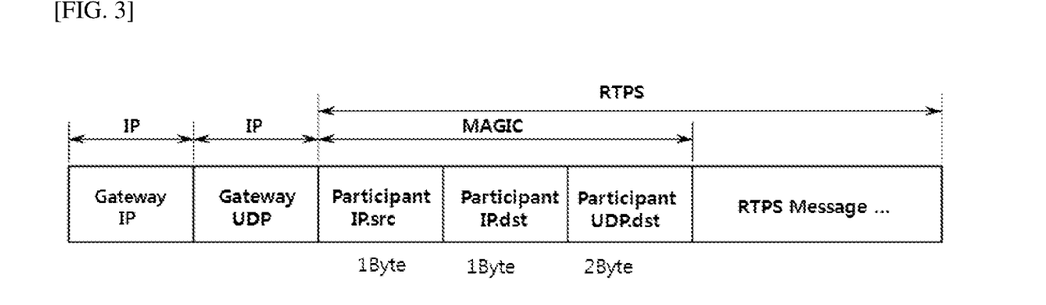
FIG. 3 is a diagram illustrating a structure of a message transmitted using an RTPS protocol in accordance with an embodiment of the present disclosure.

Here, the message may have a configuration as illustrated in FIG. 3, which illustrates the structure of a message transmitted using the RTPS protocol in accordance with an embodiment of the present disclosure. The message structure may include gateway IP information, gateway UDP information, magic (MAGIC) information, and message information.

That is, as illustrated in FIG. 3, the message is composed of the magic (MAGIC) information and the massage (RTPS Message) information. The magic information as a packet for simple tunneling can include source IP information (e.g., Participant IP.src), destination IP information (e.g., Participant IP.dst), and destination UDP information (e.g., Participant UDP.dst) about a source participant. Here, the source IP information can be 1 byte, the destination IP information can be 1 byte, and the destination UDP information can be 2 bytes.

That is, the conventional distribution network publishes the source message at the source participant node to multicast it to the WAN, and subscribes the source message at the destination participant node to transmit a reply message to the source participant node, thus performing the IP tunneling, but the simple tunneling in accordance with the present disclosure refers to the magic information included in the message to generate tunneling directly from the source participant node to the destination participant node, thus achieving the simple tunneling without going through various processes.

In the distribution network system, when transmitting and receiving the message, each of the node management gateway devices 110 to 120 changes a header in the packet of the message, maps and changes a private network band of each node into any virtual network band using a configuration file in order to communicate between the private networks through the WAN and then transmit it to the WAN, and when receiving the RTPS packet from the WAN, changes the virtual network band into the actual network band at the location receiving the destination IP address band and then delivers it to a destination device.

In this time, each of the node management gateway devices 110 to 120 can serve as a gateway equipped with a power field protocol such as DNP, IEC61850, and IEC61970.

The Distributed Energy Resource Management System (DERMS) in the distribution network can execute the connection between the respective systems through the system connection switches, and the Data Management System (DMS) can execute the connection between the respective systems through the Feeder Remote Terminal Unit (FRTU).

Accordingly, the node management gateway devices 110 to 120 in accordance with the present disclosure can be configured to be included inside the system connected switch device, and can be also connected to the system connected switch by wire as a separate independent device.

In addition, the node management gateway devices 110 to 120 in accordance with the present disclosure can be configured to be included inside the Feeder Remote Terminal Unit (FRTU), and can be also connected to the FRTU by wire, such as serial communication, as a separate independent device. That is, the node management gateway devices 110 to 120 in accordance with the present disclosure serve as a gateway to replace the FRTU.

Accordingly, although a plurality of node management gateway devices 110 to 120 using the RTPS protocol of the data-centric object-oriented communication (DDS) are connected to each other through the WAN, each of the node management gateway devices 110 to 120 can transmit and receive the message as if all nodes communicate in the LAN through the simple tunneling.

In addition, when the node management gateway device 111 is connected to the Energy Storage System (ESS) system by wire, the node management gateway device 111 can execute, for example, a gateway function as a gateway device connected to an energy storage device, and also execute the node management in real time.

In addition, even when the node management gateway device 113 is connected to the solar power generation system by wire, the node management gateway device 113 can execute, for example, a gateway function as a gateway device connected to a solar power generation device, and also execute the node management in real time.

In addition, when the node management gateway device 112 is connected to the wind power generation system by wire, the node management gateway device 112 can execute, for example, a gateway function as a gateway device connected to a wind power generation device, and also execute the node management in real time.

In addition, when the node management gateway device 110 is connected to the electric vehicle system by wire, the node management gateway device 110 can execute, for example, a gateway function as a gateway device connected to an electric vehicle charging device, and also execute the node management in real time.

In addition, when the node management gateway device 114 is connected to the transmission system by wire, the node management gateway device 114 can execute, for example, a gateway function as a gateway device connected to a transmission device, and also execute the node management in real time.

Then, when the node management gateway device 120 is connected to the distribution system by wire, the node management gateway device 120 can execute, for example, a gateway function as a gateway device connected to a distribution device, and also execute the node management in real time.

Figure 4:
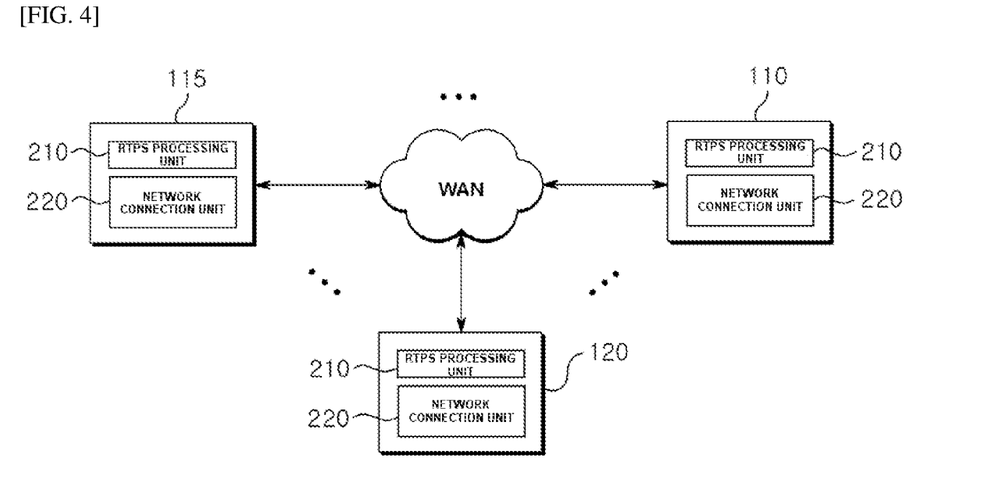
FIG. 4 is a block diagram schematically illustrating an internal configuration of the node management gateway device in accordance with an embodiment of the present disclosure.

FIG. 4 schematically illustrates an internal configuration of the node management gateway device in accordance with an embodiment of the present disclosure.

Referring to FIG. 4, the node management gateway devices 110 to 120 in accordance with the embodiment of the present disclosure can be included in a node using the data-centric object-oriented communication scheme, and include an RTPS processing unit 210 and a network connection unit 220 in order to communicate with other gateway devices connected to the WAN.

The RTPS processing unit 210 can transmit or receive the message using the RTPS protocol of the data-centric object-oriented communication (DDS), and add the magic information to the header of the message to transmit or receive it to the WAN, thus executing the management for the connection between the respective nodes and the addition and deletion of each node in real time. Here, the magic information can have a configuration including source IP information, destination IP information, and destination UDP information of the message.

In addition, the network connection unit 220 can execute the network connection with each node in order to perform an operation of the RTPS processing unit 210. That is, the network connection unit 220 can include from a physical layer to a session layer or to a transport layer in an Open System Interconnection (OSI) 7 layer.

Here, the RTPS processing unit 210 is interposed between a presentation layer and an application layer in the OSI 7 layer to execute the management for the connection between the respective nodes and the addition and deletion of each node in real time.

In addition, when not using a Network Address Translator (NAT), the RTPS processing unit 210 can broadcast an Address Resolution Protocol (ARP) demand packet to the WAN to transmit the message to the gateway responding to the ARP demand packet, when using the Network Address Translator (NAT), add the magic information to the header of the message to transmit it to the WAN, convert an IP band into the original based on a fixed subnet mapping table in the message received from the WAN, and deliver the message that the IP band has been converted into the original to the destination device.

Figure 5:
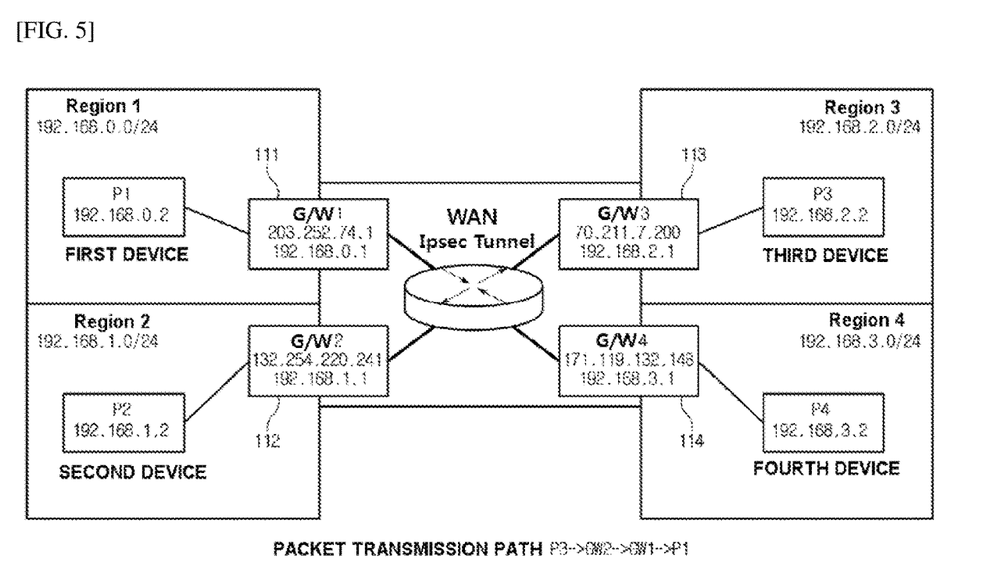
FIG. 5 is a diagram illustrating the IP information of each node for explaining a packet transmission path of the node management gateway device in accordance with an embodiment of the present disclosure.

FIG. 5 illustrates the IP information of each node for explaining a packet transmission path of the node management gateway device in accordance with an embodiment of the present disclosure. In the embodiment of the present disclosure, it is assumed that the message is transmitted from the third device P3 at the source node to the first device P1 at the destination node.

As illustrated in FIG. 5, the source node includes the third device P3 located in a third region Region 3 and a third gateway GW3 connected to the third device P3.

In the example of FIG. 5, the IP address of the third device P3 is 192.168.2.2, and the IP information of the third region Region 3 is 192.168.2.0/24. The IP information of the third gateway device GW3 has 70.211.7.200/192.168.2.1.

The destination node includes the first device P1 located in a first region Region 1, and the first gateway device GW1 connected to the first device P1.

The IP address of the first device P1 is 192.168.0.2, and the IP information of the first region Region 1 is 192.168.0.0/24. The IP information of the first gateway device GW1 is 203.252.74.1/192.168.0.1.

The IP address of the fourth device P4 neighboring the third device P3 is 192.168.3.2 and is located in a fourth region Region 4, and the IP information of the fourth region is 192.168.3.0/24. The IP information of the fourth gateway GW4 connected to the fourth device P4 is 171.119.132.148/192.168.3.1.

The IP address of the second device P2 neighboring the first device P1 at the destination node is 192.168.1.2 and is located in the second region Region 2, and the IP information of the second region is 192.168.1.0/24.

The first gateway GW1 and the second gateway GW2, and the third gateway GW3 and the fourth gateway GW4 are all connected to the Wide Area Network (WAN), and when transmitting the message using the RTPS protocol, IP tunneling can be performed.

Figure 6:
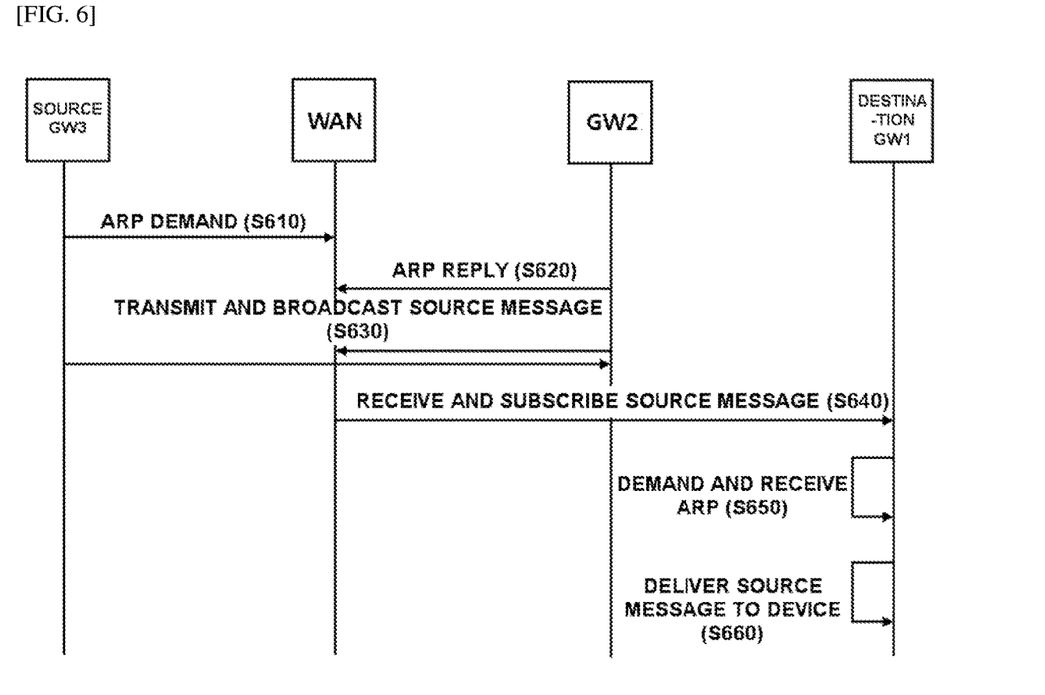
FIG. 6 is a diagram illustrating a packet transmission path when the node management gateway device in accordance with an embodiment of the present disclosure does not use a Network Address Translator (NAT).

FIG. 6 illustrates a packet transmission path when the node management gateway device in accordance with an embodiment of the present disclosure does not use the Network Address Translator (NAT).

Referring to FIGS. 2 to 6, the node management gateway device 113 in accordance with the embodiment of the present disclosure can explain, for example, the third gateway device GW3 connected to the third device P3 in the third region Region 3 of the solar power generation system.

In FIG. 5, the IP address of the third gateway device GW3 is 192.168.2.1, is connected to the WAN, and is connected to the third device P3.

In the embodiment of the present disclosure, as illustrated in FIG. 5, the transmission of the message from the third device P3 at the source node to the first device P1 at the destination (reception) node using the RTPS protocol will be explained, for example.

As illustrated in FIG. 6, in the case that the RTPS processing unit 210 does not use the Network Address Translator (NAT), when the first device P1 at the destination node is not present in the same subnet and knows the IP address (192.168.1.1) of the second gateway GW2 112 neighboring the first gateway GW1 111 connected to the first device P1 but does not know the MAC address of the second gateway GW2, the node management gateway device 113 in accordance with the embodiment broadcasts the ARP demand packet to the WAN in order to know the MAC address of the second gateway GW2 S610.

In this time, the second gateway device GW2 112 connected to the second device P2 neighboring the first device P1 transmits the ARP reply packet to the third gateway device GW3 113 connected to the third device P3 at the source node S620.

Accordingly, when receiving the ARP reply packet from the second gateway GW2 112, the third gateway device GW3 113 transmits the source message to the second gateway GW2 112 in the unicast scheme S630. When receiving the source message from the third gateway device GW3 113, the second gateway GW2 112 broadcasts the received source message to the WAN S630.

Then, the first gateway GW1 111 receives the source message through the WAN to subscribe it S640.

In this time, when trying to transmit the source message to the first device P1 (192.168.0.2) connected to itself but does not know the MAC address of the first device P1, the first gateway GW1 111 transmits the ARP demand packet to the first device P1, and the first device P1 transmits the ARP reply packet having the MAC address to the first gateway device GW1 111 S650.

Then, when receiving the ARP reply packet having the MAC address from the first device P1, the first gateway device GW1 111 delivers the source message to the first device P1 having the MAC address based on the MAC address included in the ARP reply packet S660.

Accordingly, the source message is transmitted from the third device P3 at the source node to the first device P1 at the destination (reception) node through the third gateway GW3 113, the second gateway GW2, and the first gateway GW1. The first device P1 can execute the processing for the received source message.

As described above, the node management gateway device 113 in accordance with the present disclosure does not use the Network Address Translator (NAT), such that it does not perform the address conversion at all, thus solving the limitation that the LAN having the same band should be not present.

Figure 7:
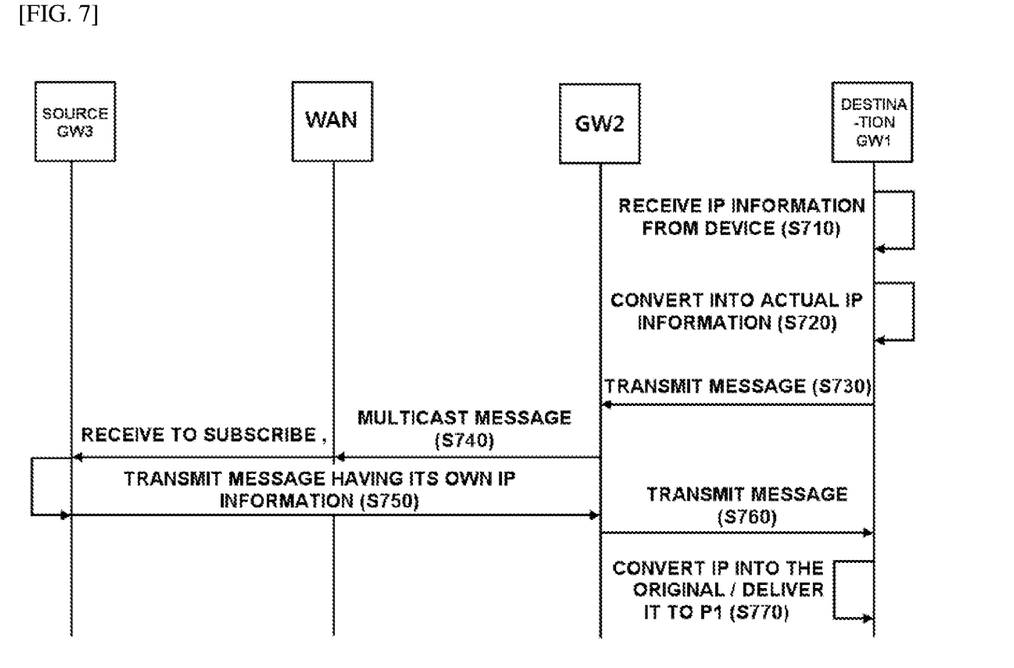
FIG. 7 is a diagram illustrating a packet transmission path when the node management gateway device in accordance with an embodiment of the present disclosure uses the Network Address Translator (NAT).

FIG. 7 is a diagram illustrating a packet transmission path when the node management gateway device in accordance with an embodiment of the present disclosure uses the Network Address Translator (NAT).

Referring to FIGS. 2 to 5 and FIG. 7, the node management gateway device 113 in accordance with the embodiment of the present disclosure can explain the third gateway device GW3 connected to the third device P3 in the third region Region 3 of the solar power generation system, for example.

In FIG. 5, the IP address of the third gateway device GW3 is 192.168.2.1, is connected to the WAN, and is connected to the third device P3.

The embodiment of the present disclosure in accordance with FIG. 7 explains, for example, that the message is transmitted from the third device P3 at the source node to the first device P1 at the destination (reception) node using the RTPS protocol.

First, when the first device P1 at the destination node delivers its own participant IP information (192.168.0.2: 7410) to the first gateway GW1 111 for multicast disclosure S710, the first gateway GW1 111 converts it into its own actual IP information (192.168.0.1) S720, and as illustrated in FIG. 3, adds the magic information to transmit the source message to the neighboring second gateway GW2 112 S730.

In this time, since the IP address (192.168.0.2) of the first device P1 is a virtual IP address, the first gateway GW1 111 changes the virtual IP address to its own actual IP address (192.168.0.1), generates the source message adding the magic information illustrated in FIG. 3, that is, the source IP, the destination IP, and the destination UDP, and delivers the generated source message to the second gateway GW2 112. The first gateway GW1 111 stores the thus converted IP information in the virtual fixed subnet mapping table.

That is, the DDS gateway (G/W) in accordance with the present disclosure operates a protocol header of a packet in order to operate the DDS protocol targeted for operation in the LAN in the WAN.

In addition, the present disclosure maps a private network band of remote sites to any virtual network band using a configuration file for the communication between the private networks through the WAN.

Then, the second gateway GW2 112 multicasts the source message to the WAN S740.

Accordingly, the node management gateway device 113 in accordance with the present disclosure receives and subscribes the multi-casted source message from the second gateway GW2 112 S750.

In the Smart Gateway of the present disclosure, the DDS G/W can fetch the packet transmitted to the network interface from the IoT Framework through memory communication.

In addition, the node management gateway devices 110 to 120 of the present disclosure can inspect the header of the packet to pass all DDS G/W packets other than the protocol necessary for network communication such as ARP, and proceed the processing only for the DDS packet.

Then, the node management gateway device 113 generates the source message having destination (dst) address information and its own (src) address information based on the magic information included in the source message to transmit it to the second gateway GW2 112 in the unicast scheme S750.

Then, the second gateway GW2 112 receives the source message to transmit it to the first gateway GW1 111 based on the destination information S760.

The first gateway GW1 111 converts the IP band into the original based on the virtual fixed subnet mapping table in the source message, and delivers the source message that the IP band is converted into the original to the first device P1 connected to itself S770. That is, when being requested to transmit the message from the first device P1, the first gateway GW1 111 converts the participant IP information into its own actual IP address to restore the IP band in the source message into the original based on the information stored in the virtual fixed subnet mapping table, and then delivers it to the first device P1.

In addition, when adding the magic information to the source message to outbound it to the WAN, as illustrated in FIG. 3, the RTPS processing unit 210 in accordance with the present disclosure can fetch only the least significant byte in the source IP information of the magic information, add it to the start part of the magic information, add the destination IP information to the next location of the source IP information, add the destination UDP information to the next location of the destination IP information, set the source IP information as its own gateway IP, and set the destination IP information as the gateway IP of the other party. Here, since the outbound corresponds to the fact that the participant in his or her region has transmitted the DDS message, before the message is transmitted to the WAN, as illustrated in FIG. 3, the simple tunneling is applied by adding the magic packet to the message.

In addition, when inbounding the source message from the WAN, the RTPS processing unit 210 can change the IP in the magic information included in the source message into the one transmitted to the destination participant by the source participant, also change the UDP therein into the one transmitted to the destination participant by the source participant by referring to the fixed (virtual) subnet mapping table (vSubnet lookup table) using its own gateway IP as a key, and transmit the source message to the destination device by referring to the magic information.

In addition, in case of using the Network Address Translator (NAT), when adding the magic information to the source message to outbound it to the WAN, the RTPS processing unit 210 can replicate the sample message corresponding to Reliable Quality of Service (QoS) among the outbound sample messages to transmit the original message and the replicated message to the WAN twice. In this time, the second message (packet) is transmitted at a little interval, and the interval can be set by the user using the gateway setting file.

Then, the RTPS processing unit 210 can sniff the outbound message having the information of a datawriter while transmitting or receiving an Endpoint Discovery Protocol (EDP) message between other gateways, also sniff the QoS setting in the corresponding outbound message, set a Globally Unique Identifier (GUID) of the corresponding message as a key by combining the GUID of the RTPS header and the entity ID to set the QoS as a value, replicate the sample message corresponding to the reliable QoS that the QoS becomes more than a certain level, and transmit the replicated sample message to the WAN twice.

As described above, in accordance with the present disclosure, it is possible to achieve the node management gateway device and the method thereof, which transmit and receive messages using the RTPS protocol of the data-centric object-oriented communication (DDS) between the system connected switches of the Distributed Energy Resource Management System (DERMS) connected to the energy storage system, the solar power generation system, the wind power generation system, or the electric vehicle system and the Feeder Remote Terminal Unit (FRTU) of the Data Management System (DMS) connected to the distribution system or the transmission system, thus managing the connection frequently occurred between the nodes and the addition and deletion of the node in real time.

Those skilled in the art to which the present disclosure pertains will understand that the present disclosure can be implemented in other various forms without departing from the technical spirit or essential characteristics of the present disclosure, so the aforementioned embodiments should not be construed as being limitative. The scope of the present disclosure is disclosed in the following claims rather than the detailed description, and it should be understood that all modifications or variations derived from the meanings and scope of the appended claims and equivalents thereof.

What is claimed is:

1. A node management gateway device included in a node using a scheme for data-centric object-oriented communication and configured to communicate with other gateway devices connected to a Wide Area Network (WAN), the node management gateway device comprising:
   a Real-Time Publish-Subscribe (RTPS) processing unit for transmitting and receiving a message with the other gateway devices using an RTPS protocol of the data-centric object-oriented communication and for inserting magic information into a header of the received message in order to transmit the received message to the WAN, the inserted magic information including source IP information of the message, destination IP information of the message, and destination User Datagram Protocol (UDP) information of the message; and
   a network connection unit for performing an operation of the RTPS processing unit by executing a network connection with each of the other gateway devices.

2. The node management gateway device of claim 1, wherein, if a destination device is not present in the same subnet and a MAC address of the destination device is unknown, the RTPS processing unit is configured to broadcast an Address Resolution Protocol (ARP) demand packet to the WAN in order to transmit the message including the magic information to a gateway device from which an ARP reply packet is received, the magic information being inserted into the transmitted message when the RTPS processing unit is not using a Network Address Translator (NAT).

3. The node management gateway device of claim 1, wherein, when the RTPS processing unit is using a Network Address Translator (NAT), the RTPS processing unit is configured to transmit the message including the magic information to the WAN, and convert an IP band into the original based on a Fixed Subnet Mapping in the message received from the WAN to deliver it to the destination device.

4. The node management gateway device of claim 2, wherein, when the node management gateway device is connected to the destination device and the MAC address of the destination device is unknown, the RTPS processing unit is configured to transmit the ARP demand packet to the destination device in order to receive the ARP reply packet, and transmit the message to the destination device based on the above.

5. The node management gateway device of claim 4, wherein the RTPS processing unit is configured to transmit the message to the destination device having the MAC address included in the ARP reply packet.

6. The node management gateway device of claim 1, wherein, when inserting the magic information into the header of the message being outbounded to the WAN, the RTPS processing unit fetches only the least significant byte in the source IP information, adds the fetched byte to the start part of the magic information, adds destination IP information to next location of the source IP information, adds destination UDP information to next location of the destination IP information, sets the source IP information as its own gateway IP, and sets the destination IP information as the gateway IP of the other party.

7. The node management gateway device of claim 1, wherein when inbounding the message from the WAN, the RTPS processing unit changes the IP in the inserted magic information into the one transmitted to a destination participant by a source participant and changes the UDP therein into the one transmitted to the destination participant by the source participant by referring to a virtual subnet mapping using its own gateway IP as a key, and transmits the message to the destination device by referring to the magic information.

8. The node management gateway device of claim 1, wherein in case of using the Network Address Translator (NAT), when inserting the magic information into the header of the message to outbound it to the WAN, the RTPS processing unit replicates a sample message corresponding to a reliable Quality of Service (QoS) among outbound sample messages in order to transmit it to the WAN twice.

9. The node management gateway device of claim 8, wherein with respect to the sample message corresponding to the reliable QoS among the outbound sample messages, the RTPS processing unit sniffs an outbound message having information of a datawriter while transmitting or receiving an Endpoint Discovery Protocol (EDP) message between the other gateway devices, sniffs the QoS setting in the corresponding outbound message, sets a Globally Unique Identifier (GUID) of the corresponding message as a key by combining the GUID and entity ID of the header of the message to set the QoS as a value, replicates the sample message corresponding to the reliable QoS that the QoS becomes more than a certain level, and transmits the replicated sample message to the WAN twice.

10. A method of managing a node of a gateway device that is connected to a source device and is configured to communicate with a destination gateway device connected to a destination device through a Wide Area Network (WAN), the method comprising:
the gateway device broadcasting an Address Resolution Protocol (ARP) demand packet to the WAN; and
the gateway device transmitting a message to other gateway devices transmitting an ARP reply packet, the message being transmitted by inserting magic information into a header of the transmitted message, the inserted magic information including source IP information of the message, destination IP information of the message, and destination UDP information of the message.

11. The method of managing the node of the gateway device of claim 10, wherein the source IP information is located at start part of the magic information, the destination IP information is located at next location of the source IP information, and the destination UDP information is located at next location of the destination IP information.

12. A method of managing a node of a gateway device that is connected to a destination device and is configured to communicate with a source gateway device connected to a source device through a Wide Area Network (WAN), the method comprising:
the gateway device receiving a message having IP information from the destination device;
the gateway device converting the IP information in the received message into actual network IP information to store the converted IP information in a virtual subnet mapping table;
the gateway device transmitting the message having the actual network IP information to the WAN;
the gateway device receiving a reply message from the WAN;
the gateway device converting the actual network IP information into the IP information originally based on the virtual subnet mapping table in the received reply message; and
the gateway device delivering the reply message that the actual network IP information is converted into the IP information originally to the destination device.

13. The method of managing the node of the gateway device of claim 12,
wherein the message having the actual network IP information is transmitted to the WAN by
inserting magic information into the header of the message,
fetching only the least significant byte in the source IP information of the magic information,
adding the fetched byte to the start part of the magic information,
adding destination IP information to next location of the source IP information,
adding destination UDP information to next location of the destination IP information,
setting the source IP information as its own gateway IP, and
setting the destination IP information as gateway IP of the other party, and
wherein the inserted magic information includes source IP information of the message, destination IP information of the message, and destination User Datagram Protocol (UDP) information of the message.

14. The method of managing the node of the gateway device of claim 13, wherein the receiving the reply message from the WAN comprises
when inbounding the reply message from the WAN, the gateway device changing the IP in the magic information included in the reply message into the one transmitted to a destination participant by a source participant and also changing the UDP therein into the one transmitted to the destination participant by the source participant by referring to a virtual subnet mapping table using its own gateway IP as a key.

15. The method of managing the node of the gateway device of claim 13, wherein when adding the magic information to the header of the message to outbound it to the WAN, the gateway device replicates a sample message corresponding to reliable Quality of Service (QoS) among outbound sample messages to transmit it to the WAN twice.

16. The method of managing the node of the gateway device of claim 15, wherein with respect to the sample message corresponding to the reliable QoS among the outbound sample messages, the gateway device sniffs an outbound message having information of a datawriter while transmitting or receiving an Endpoint Discovery Protocol (EDP) message between other gateway devices, sniffs the QoS setting in the corresponding outbound message, sets a Globally Unique Identifier (GUID) of the corresponding message as a key by combining the GUID and entity ID of the header of the message to set the QoS as a value, replicates a sample message corresponding to the reliable QoS that the QoS becomes more than a certain level, and transmits the replicated sample message to the WAN twice.

* * * * *